United States Patent [19]

Oyama et al.

[11] Patent Number: 4,681,180
[45] Date of Patent: Jul. 21, 1987

[54] POWER TRANSMISSION SYSTEM FOR REAR WHEELS OF A MOTOR VEHICLE

[75] Inventors: Fusami Oyama, Ohramachi; Akira Takahashi, Ohta, both of Japan

[73] Assignee: Fuji Jukogyo Kabushiki Kaisha, Tokyo, Japan

[21] Appl. No.: 917,653

[22] Filed: Oct. 10, 1986

[30] Foreign Application Priority Data

Oct. 18, 1985 [JP]  Japan ................... 60-234226

[51] Int. Cl.$^4$ ............................................. B60K 17/16
[52] U.S. Cl. .................................... 180/76; 74/650; 74/711; 180/248
[58] Field of Search ............ 180/76, 248; 74/650, 74/710, 710.5, 711; 192/87.13, 87.18, 0.098, 357

[56]  References Cited

U.S. PATENT DOCUMENTS

| | | | |
|---|---|---|---|
| 2,884,811 | 5/1959 | Benno | 180/76 |
| 3,519,314 | 7/1970 | Ballard | 180/76 |
| 3,888,137 | 6/1975 | Brieten | 74/650 |
| 3,966,264 | 6/1976 | Mattori et al. | 180/76 |
| 4,488,454 | 12/1984 | Goscenski, Jr. | 74/650 |

FOREIGN PATENT DOCUMENTS

| | | | |
|---|---|---|---|
| 58-422 | 1/1983 | Japan | 180/76 |
| 593944 | 1/1978 | U.S.S.R. | 180/76 |

Primary Examiner—John J. Love
Assistant Examiner—Kenneth R. Rice
Attorney, Agent, or Firm—Martin A. Farber

[57]  ABSTRACT

A final reduction gear comprising a pair of bevel gears are provided between a rear drive shaft and a rar axle shaft. A pair of oil hydraulic clutches are provided on both ends of the rear axle shaft for transmitting output of the final reduction gear to rear wheels of a motor vehicle respectively. Pressure of oil appplied to each of the clutches is controlled in accordance with driving conditions of the vehicle thereby controlling transmitting torque capacity of each clutch at cornering.

6 Claims, 6 Drawing Figures

POWER TRANSMISSION SYSTEM FOR REAR WHEELS OF A MOTOR VEHICLE

BACKGROUND OF THE INVENTION

The present invention relates to a system for transmitting the power of an engine to rear wheels of a motor vehicle.

In the power transmission system for rear wheels, the differential is disposed to permit one rear of wheels to turn at a different speed from the other, so that a motor vehicle may go round corners without skidding. However, since driving torques are equally transmitted to both wheels, such transmission system can not improve stability and driveability at cornering.

SUMMARY OF THE INVENTION

The object of the present invention is to provide a system for transmitting the power of an engine to rear wheels which may improve the stability and driveability of a motor vehicle at cornering without skidding.

In accordance with the present invention, a pair of oil hydraulic clutches for both rear wheels are provided in a power transmission system and a control unit is provided for controlling the transmitting torque capacities of both clutches in dependence on driving conditions.

According to the present invention, there is provided a system comprising a rear drive shaft connected to a propeller shaft of a motor vehicle, final reduction gear means operatively connected to the rear drive shaft, a pair of oil hydraulic clutches for transmitting output of the final reduction gear to rear wheels of the motor vehicle respectively, hydraulic circuit means including passage means for applying pressurized oil to said clutches and control valve means for controlling pressure of the oil applied to each of the clutches, sensing means for sensing driving conditions of the vehicle at cornering for producing signals representing sensed conditions, control unit responsive to the signals for operating said control valve means whereby controlling transmitting torque capacity of each clutch at cornering.

In an aspect of the invention, the final reduction gear means comprises a first bevel gear provided on the end of the rear drive shaft and a second bevel gear provided on a rear axle shaft and engaged with the first bevel gear, and the oil hydraulic clutches are provided on both sides of the rear axle shaft. The hydraulic circuit means includes pressure regulator valve means for producing a constant control pressure, and solenoid operated valve means responsive to the signals from the control unit for controlling the constant control pressure.

The other objects and features of this invention will be apparently understood from the following description with reference to the accompanying drawings.

DETAILED DESCRIPTION OF THE PREFERRED EMBODIMENT

Figure 1:
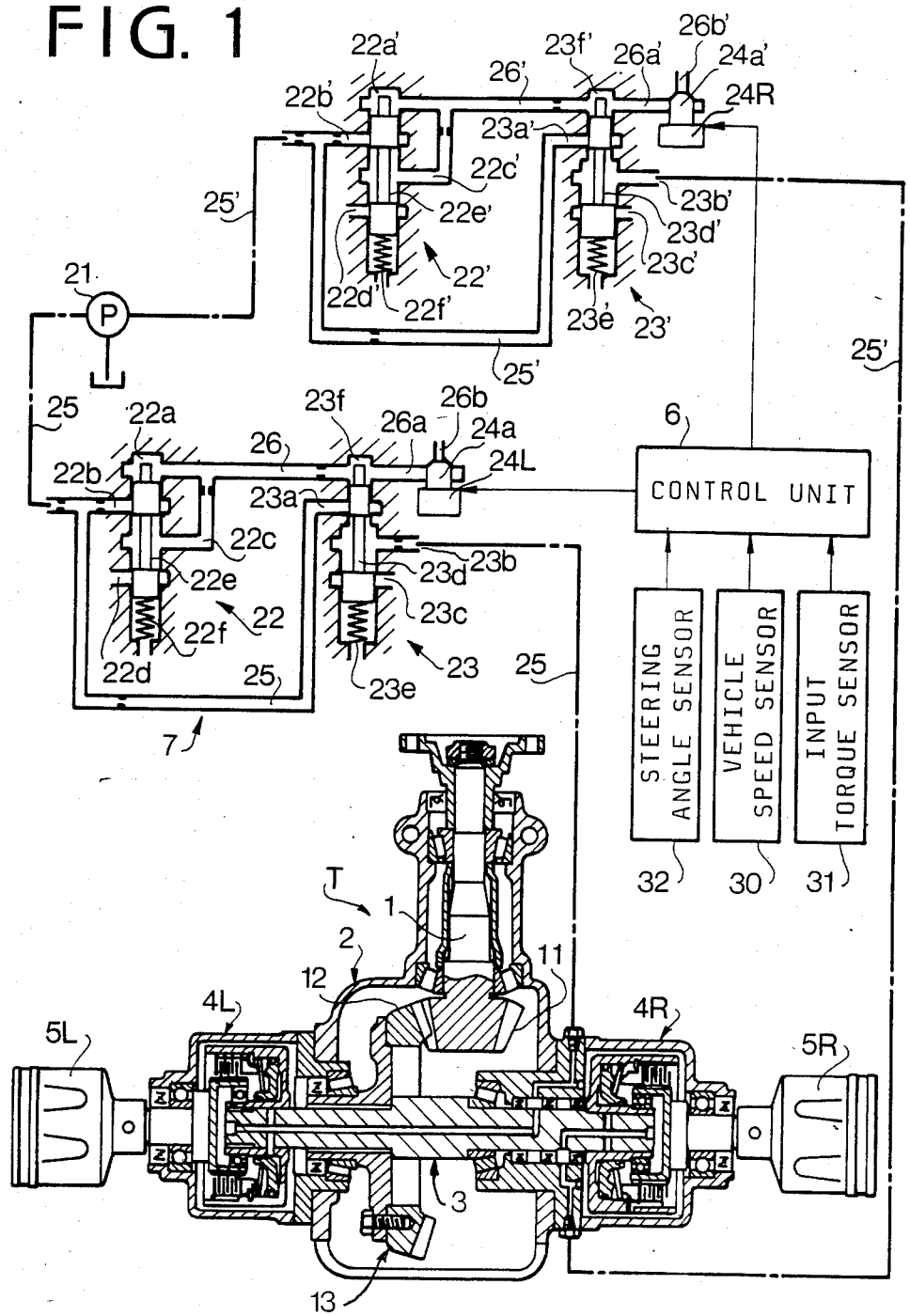
FIG. 1 is a schematic diagram showing a system according to the present invention.
Figure 3:
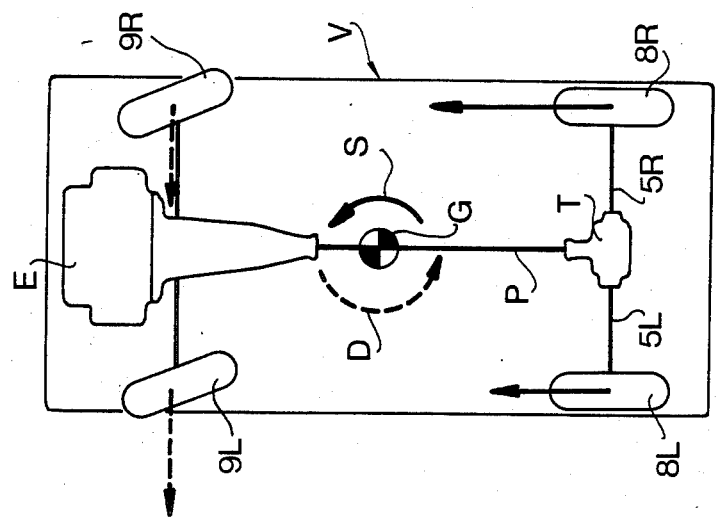

Referring to FIGS. 1 and 3, a motor vehicle V is provided with an engine E at a front portion thereof. A transmission system T has rear drive shaft 1 connected to a propeller shaft P of the vehicle at the rear end thereof and rotatably mounted in a gear case 2. The shaft 1 has a bevel gear 11 at the rear end thereof which is engaged with a bevel gear 12 to form a final reduction gear 13. The bevel gear 12 is securely mounted on a rear axle shaft 3 rotatably mounted in the case 2.

Both ends of the axle shaft 3 project from the case 2 and are connected to left and right drive shafts 5L and 5R through left and right oil hydraulic multiple-disk clutches 4L and 4R so as to separately drive rear wheels 8L and 8R (FIG. 3). Each clutch is adapted to be changed in transmitting torque capacity in accordance with pressure of oil supplied from an oil hydraulic circuit 7 controlled by an electronic control unit 6.

The oil hydraulic circuit 7 for the left clutch 4L comprises a pump 21, a pressure regulator valve 22, a hydraulic pressure control valve 23, solenoid operated valve 24L. The clutch 4L is communicated with the pump 21 through a passage 25 and valve 23.

The pressure control valve 23 has a port 23a communicated with the pump 21, a port 23b connected to the clutch 4L, a drain port 23c and a spool 23d. The spool 23d is kept at neutral position by a control pressure in an end chamber 23f against a spring 23e to close ports 23a and 23c, so that the pressure in the clutch 4L is held constant.

The pressure regulator valve 22 comprises an end chamber 22a communicated with the chamber 23f through a passage 26, a port 22b connected to the pump 21, a port 22c connected to the passage 26, a drain port 22d, a spool 22e and a spring 22f. At a neutral position of the spool 22e, ports 22b and 22d are closed. When the control pressure in the chamber 22a rises, the spool moves downwardly against the spring 22f to open the drain port 22d, thereby reducing the control pressure. When the control pressure reduces, port 22b opens to increase the control pressure. Thus, the control pressure in chambers 22a and 23f is held at a constant value. The solenoid operated valve 24L has a valve 24a closing a passage 26a communicated with chamber 23f. When energized, the valve 24a is drawn to communicate the passage 26a with a drain passage 26b to reduce the control pressure.

Since a hydraulic circuit of the right clutch 4R is the same as the left clutch 4L, common parts thereof are identified with the same numbers as those of left clutch with a prime added thereto except a solenoid operated valve 24R.

The control system is provided with a vehicle speed sensor 30, a steering angle sensor 31 sensing the steering angle of a front wheel and the steering direction, and an input torque sensor 32 sensing the torque transmitted to the rear wheels. Outputs of these sensors are applied to the rear drive shaft 1.

Figure 2:
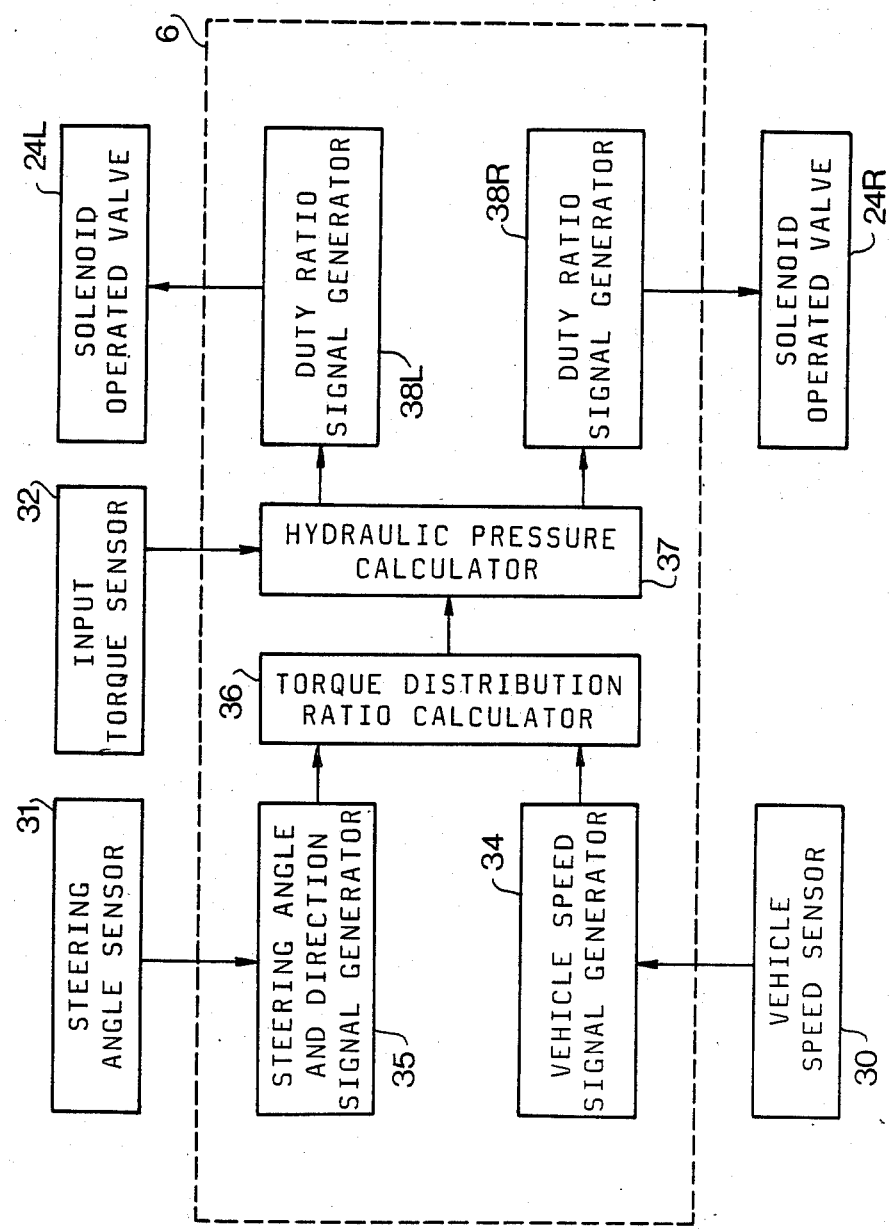
FIG. 2 is a block diagram of a control unit.

Referring to FIG. 2, the output of the vehicle speed sensor 30 is applied to a vehicle speed signal generator 34, and the output of the steering angle sensor 31 is fed to a steering angle and direction signal generator 35. Output signals of both the generators 34 and 35 are applied to a torque distribution ratio calculator 36 which produces an output signal representing torque distribution ratio for left and right clutches 4L and 4R.

The output signal of the calculator 36 and the output signal of the input torque sensor 32 are fed an oil hydraulic pressure calculator 37 which produces pressure signals for both clutches. The pressure signals are applied to duty ratio signal generators 38L and 38R which generate duty ratio signals each of which is in the form of a pulse train. The solenoids of solenoid operated valves 24L and 24R are energized at duty ratios dependent on the duty ratio signals.

When the vehicle goes straight ahead, the calculator 36 produces an output signal for distributing equal torques ($T_L = T_R$) to both wheels 8L and 8R through the clutches 4L and 4R. When the vehicle negotiates a corner in a moderate or low speed range, the calculator 36 produces a signal for distributing a larger torque to the outer wheel at the corner. To the contrary, at high speed cornering, the output signal of the calculator 36 represents to distribute a larger torque to the inner wheel than the outer wheel.

Figure 5A:
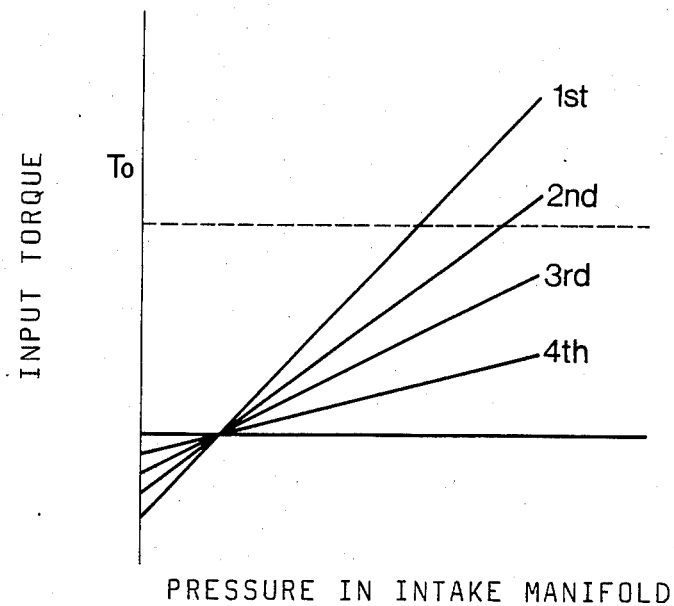
FIG. 5a is a graph showing input torque characteristics.
Figure 5B:
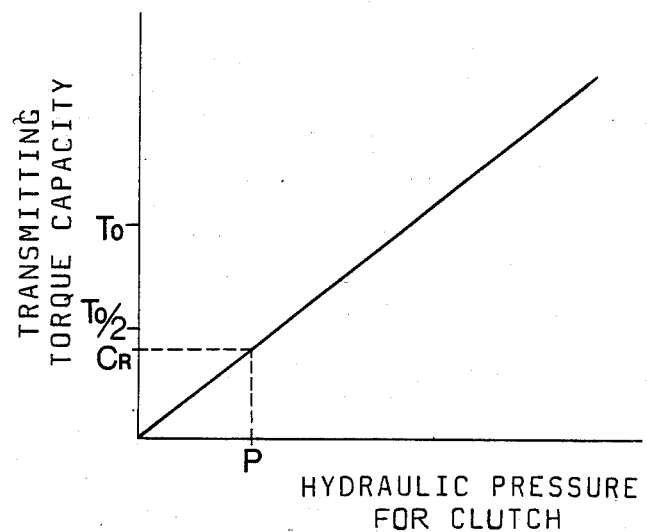
FIG. 5b is a graph showing a clutch transmitting torque capacity.

Referring to FIG. 5a, the input torque To is decided by a selected change-speed gear, for example, from 1st speed to 4th speed, and pressure in an intake passage at downstream of a throttle valve of the engine. The transmitting torque capacity of the clutch increases with increase of the pressure of oil applied thereto as shown in FIG. 5b.

At driving on a straight line ($T_L = T_R$), equal pressures $P_L$, $P_R$ are set to maximum values respectively, so that both clutches 4L, 4R transmit the input torque at maximum transmitting torque capacities without slipping at any input torque. Namely, the half of the input torque is transmitted to each rear wheel. In the case of torque distribution of $T_L > T_R$, a maximum oil pressure $P_L$ is applied to the left clutch 41 to provide a maximum transmitting torque capacity $C_L$. Thus, torque of $T_O \times T_L/(T_L + T_R)$ is transmitted to the left wheel to drive it without slipping. On the other hand, transmitting torque capacity $C_R$ for the right clutch 4R is;

$$C_R = T_O \times T_R/(T_L + T_R)$$

Accordingly, oil pressure to the right clutch 4R is decided in accordance with the transmitting torque capacity $C_R$ to transmit the torque dependent on the capacity $C_R$ to the right wheel, allowing the slipping of the right clutch.

In order to reduce the pressure of oil applied to the left clutch 4L, when the vehicle makes a left turn at a moderate or low speed, the duty ratio signal generator 38L produces a duty ratio signal having a small value. Accordingly, the amount of drain oil from drain port 26b of the solenoid operated valve 24L reduces to increase the control pressure in chamber 23f. Thus, the spool 23d is downwardly shifted to close 23a to reduce the pressure applied to the left clutch 4L. To the contrary, when the duty ratio of the signal applied to the solenoid operated valve 24R has a large value, the control pressure in the chamber 23f, reduces so that the pressure in the right clutch 4R rises. Thus, the left clutch 4L slips to perform a smooth cornering, absorbing the difference between speeds of left and right wheels. At that time, a left turn yawing moment about a center of gravity G generates in the body of the vehicle as shown by a solid line S in FIG. 3, because of a large driving torque by right wheel 8R. Since the direction of the yawing direction is the same as the direction shown by a dotted line D caused by a yawing moment received by front wheels 9L and 9R, steering characteristics can be improved.

Figure 4:
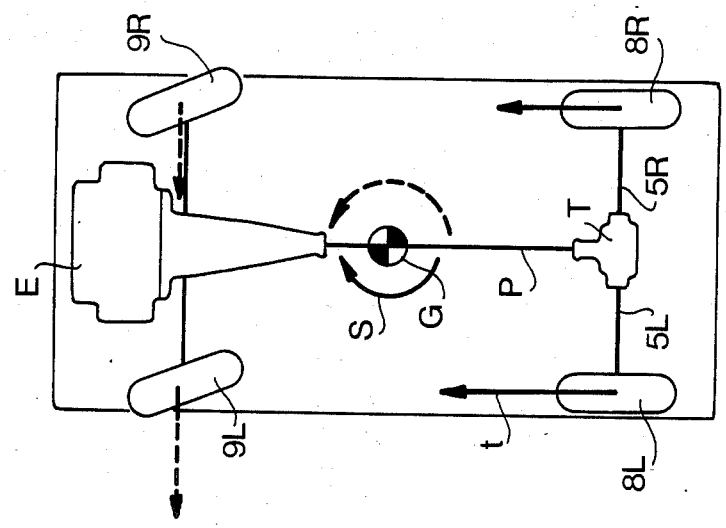
FIGS. 3 and 4 show operations at cornering of a motor vehicle.

At high speed cornering, a large torque is transmitted to the inner wheel as shown by a solid line t in FIG. 4. Accordingly, driving torque of the left wheel 8L is larger than the right wheel 8R, so that a right turn yawing moment generates as shown by solid line S. The direction of the right turn yawing moment is the reverse of the left turn yawing moment by the front wheels 9L, 9R, which operated to offset somewhat the latter yawing moment. Accordingly, stability of cornering can be improved. The difference between the speeds of outer and inner wheels is absorbed by the slipping of the outer side clutch.

While the presently referred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmission system for a motor vehicle comprising:
    a rear drive shaft connected to a propeller shaft of the motor vehicle;
    final reduction gear means operatively connected to the rear drive shaft;
    a pair of oil hydraulic clutches for transmitting output of the final reduction gear to rear wheels of the motor vehicle respectively;
    hydraulic circuit means including passage means for applying pressurized oil to said clutches and control valve means for controlling pressure of the oil applied to each of the clutches;
    sensing means for sensing driving conditions of the vehicle at cornering and for producing signals representing sensed conditions;
    control unit responsive to the signals for operating said control valve means whereby controlling transmitting torque capacity of each clutch at cornering.

2. The power transmission system according to claim 1 wherein the final reduction gear means comprises a first bevel gear provided on the end of the rear drive shaft and a second bevel gear provided on a rear axle shaft and engaged with the first bevel gear, and the oil hydraulic clutches are provided on both sides of the rear axle shaft.

3. The power transmission system according to claim 1 wherein the hydraulic circuit means further includes pressure regulator valve means for producing a constant control pressure, and solenoid operated valve means responsive to the signals from the control unit for controlling the constant control pressure.

4. The power transmission system according to claim 1 wherein the sensing means includes a vehicle speed sensor, a steering angle sensor and an input torque sensor sensing input torque applied to the rear drive shaft.

5. The power transmission system according to claim 1 wherein the control unit includes first means responsive to output signal of the sensing means for producing a signal deciding torque distribution ratio for both said clutches.

6. The power transmission system according to claim 3 wherein the control unit further includes second means responsive to the signal from the first means for producing output signals each of which is in the form of a pulse train duty ratio of which is dependent on the signal of the first means.

* * * * *